United States Patent [19]

Yasufuku et al.

[11] Patent Number: 5,055,349
[45] Date of Patent: Oct. 8, 1991

[54] MAGNETIC RECORDING MEDIUM

[75] Inventors: Yoshitaka Yasufuku; Yasuhisa Yamauchi, both of Hino, Japan

[73] Assignee: Konica Corporation, Tokyo, Japan

[21] Appl. No.: 256,714

[22] Filed: Oct. 12, 1988

[30] Foreign Application Priority Data

Oct. 16, 1987 [JP] Japan ............................. 62-262469
Oct. 16, 1987 [JP] Japan ............................. 62-262470

[51] Int. Cl.$^5$ .............................................. G11B 23/00
[52] U.S. Cl. .................................... 428/323; 427/131;
428/329; 428/694; 428/695; 428/900
[58] Field of Search .............. 428/328, 329, 694, 695, 428/900, 323; 427/131

[56] References Cited

U.S. PATENT DOCUMENTS

| 4,316,927 | 2/1982 | Kimura et al. | 428/694 |
|---|---|---|---|
| 4,414,270 | 11/1983 | Miyoshi et al. | 428/328 |
| 4,579,778 | 4/1986 | Yamaguchi et al. | 428/336 |
| 4,650,720 | 3/1987 | Yamaguchi et al. | 428/480 |
| 4,687,703 | 8/1987 | Miyoshi et al. | 428/694 |
| 4,728,563 | 3/1988 | Saito et al. | 428/900 |
| 4,781,964 | 11/1988 | Mizuno et al. | 428/694 |
| 4,857,388 | 8/1989 | Ogawa et al. | 428/694 |
| 4,871,606 | 10/1989 | Matsuura et al. | 428/694 |

FOREIGN PATENT DOCUMENTS 226162  6/1987  European Pat. Off.

Primary Examiner—Paul J. Thibodeau
Attorney, Agent, or Firm—Jordan B. Bierman

[57] ABSTRACT

A method of improving a magnetic recording medium in the physical and electromagnetic properties is disclosed. The method is comprised, in combination, of the steps of:

making a support of one selected from the group consisting of polyehtylene naphthalate and polyehtylene terephthalate;

providing on the support, a magnetic recording layer comprising a ferromagnetic metal powder, a carbon black, a lubricant, an abrasive and a binder;

providing on the opposite side of the magnetic layer, a back coating layer comprising a carbon black, non-magnetic particles and a binder;

wherein the Young's modulus of said magnetic recording medium in a traveling direction is not less than 1100 kg/mm$^2$.

14 Claims, 2 Drawing Sheets

MAGNETIC RECORDING MEDIUM

FIELD OF THE INVENTION

The present invention relates to magnetic recording media such as magnetic tape, magnetic sheet, and magnetic disk.

BACKGROUND OF THE INVENTION

Recently, a longer recording time, and higher recording density are strongly required of magnetic recording media such as a magnetic tape. In order to achieve higher recording density, a thinner and longer magnetic recording tape is required. A thinner base film, which is indispensable for a thinner tape, inturn results in reduction of stiffness of the tape; the tape edges are readily damaged in the course of loading or unloading, or when a momentary high tensive force is exerted on the tape, it sometimes is deformed, resulting in distortion in recorded data.

One conventional base film for a magnetic recording tape is a biaxial stretching polyethylene terephthalate film, in particular, a so-called "super tensilized" film intended for longer time recording, and is provided with a higher Young's modulus in a traveling direction. The maximum possible Young's modulus of a polyethylene terephthalate film in a transverse direction is approximately 800 kg/mm$^2$. A higher Young's modulus in the traveling direction inevitably results in a smaller Young's modulus in a lateral direction, and, accordingly, the edges of such a recording tape during traveling are more prone to be damaged. On the other hand, increasing a Young's modulus in the lateral direction in a film manufacturing process inevitably results in an insufficient Young's modulus in the traveling direction, and, resultantly, poor contact between the film and a magnetic head causes fluctuation in output level.

A base film endowed with a higher Young's modulus by high degree of stretching is disadvantages in that distortion caused in a film forming process remains and results in poor dimension stability. High degree of stretching is further disadvantageous because of lower product yield.

This type of base film essentially requires the processes of thermal relaxation and/or aging to eliminate residual distortion, which makes it more complicated and difficult to select and combine the production conditions of the tapes.

Therefore, there has been limitation on the stiffness of conventional magnetic recording media, and, as mentioned above, thinner recording media lack in durability, resistance to damage, and preservability of recorded data. In essence, such recording media do not satisfy every requirement for recording media associated with a longer time recording operation.

Recently, as a result of more common use of a built-in camera type VTR, the cassette tapes are often subjected to the severe conditions outdoors and in cars. Accordingly, the tapes increasingly require dimension stability that prevents distortion, and, this in turn requires dimension stability of a base film.

Meantime, as a density and S/N ratio of magnetic recording media especially for VTR and computer are getting higher recently, magnetic powder of a smaller particle size is more commonly used.

Generally, S/N ratio of a magnetic recording medium is deemed to be proportional to the square root of a number of the magnetic particles in a recording material that is responsible for recording and reproducing data, and, accordingly, a particle size of a magnetic powder used is smaller, the S/N ratio is better.

Use of finer magnetic particles of a bigger BET value (specific surface area determined by Brunauer-Emmett and Teller's equation) results in smoother surface of a magnetic layer and smaller spacing loss. This fact is advantageous in attaining higher electromagnetic conversion properties.

On the other hand, too smooth a surface of a magnetic layer intended for higher recording density deteriorates the traveling properties of a magnetic tape, which has been the problem to be solved. Such a recording medium strongly rubs a magnetic head during recording and reproducing operation, and an increase of contact area and friction factor in turn causes deteriorated traveling properties. Such case as mentioned above causes further unfavorable problems such as abrasion of a magnetic layer in repeated use, falling off of magnetic particles, and clogging on a magnetic head with the particles fallen off. A thinner magnetic tape as well as a super-smooth magnetic layer causes tape sticking to a tape guide while the tape is forwarded or wound. Thus, the traveling properties of a magnetic tape can be readily deteriorated. These problems result in a shorter service life of a magnetic tape and adverse effects on the electromagnetic conversion properties such as S/N ratio and RF output.

These problems are increasingly notable as the result of recent development of higher quality, longer recording time type magnetic tapes. Accordingly, there have been strong demands for technological breakthrough on the dilemmatic problems of higher density magnetic recording media and thinner magnetic tapes versus higher traveling properties and durability of magnetic tapes.

SUMMARY OF THE INVENTION

The object of the present invention is to provide a magnetic recording medium capable of longer recording time and excellent in durability, damage resistance, traveling properties, repeatability, aging resistance and preservability, whereby the magnetic recording medium ha excellent electromagnetic conversion properties and is capable of eliminating clogging on a magnetic head and of decreasing data dropout rate.

The present invention relates to a magnetic recording medium comprising a magnetic layer containing magnetic metal powder and carbon black, and a back-coating layer containing carbon black, wherein the Young's modulus of a medium in a traveling direction is not less than 1100 kg/mm$^2$.

BRIEF DESCRIPTION OF THE DRAWING

The number in FIGS. 1 and 2 represents the followings.

1 . . . Support
2 . . . Magnetic layer
3 . . . Back coating layer (BC layer)
4 . . . Over coating layer (OC layer)

DETAILED DESCRIPTION OF THE INVENTION

According to the invention, the Young's modulus of a medium in a traveling direction is not less than 1100 kg/mm².

A larger Young's modulus in the traveling direction positively ensures the stiffness of a magnetic recording medium that may have a thinner support. This arrangement not only makes a magnetic recording medium thinner, but also improves damage resistance by preventing damages on the edges of the magnetic recording medium in traveling. Thus, the durability of the magnetic recording medium is notably improved and the fluctuation of output level is prevented because traveling of the magnetic recording medium is positively stabilized. A Young's modulus not less than 1300 kg/mm², in a traveling direction enables to attain more significant effect. However, the preferred Young's modulus is not more than 1800 kg/mm².

Higher density recording is possible in the present invention because of employment of metal magnetic powder, which enables to provide a high performance recording medium.

However, as previously described in the prior art section, a thinner magnetic recording medium tends to have poor traveling stability and durability of a magnetic recording medium. Such problem can be overcome by synergistic effect of incorporating carbon black into a magnetic layer as well as into a back coating layer (hereinafter, referred to as a BC layer), whereby traveling stability and durability are maintained at satisfactory level; i.e. a BC layer prevents sticking of a back face of a medium, and, together with lubrication action of carbon black, improves the traveling properties of the medium, while carbon black incorporated into a magnetic layer contributes to maintaining the electromagnetic conversion properties at a higher level and decreasing a friction coefficient on the magnetic layer to positively improve durability of the layer, whereby clogging on a magnetic head as well as data dropout can be reduced.

Adding carbon black to a BC layer also improves light-shielding effect of the BC layer, and thereby an optical density of a magnetic recording medium is improved. Accordingly, a magnetic layer can be thinner, and thereby a much longer recording time can be achieved.

To materialize the effects of the invention more notably, the preferred amount of carbon black added to the magnetic layer is 0.1 to 10 parts by weight per 100 parts magnetic metal powder, while the preferred amount of carbon black added to the BC layer is within a range of 20 to 100 parts by weight per 100 parts binder resin.

Adding non-magnetic particles to the BC layer can positively ensure traveling stability and durability of a recording medium. In other words, the BC layer stabilizes traveling of the medium and prevents sticking of a back face of the medium. Additionally, the BC layer containing non-magnetic particles has been improved in durability and damage resistance, especially in the properties in repeated use. An amount of non-magnetic particles added to the BC layer is preferably within a range of 20 to 70 parts by weight per 100 parts a binder resin.

A thickness of the magnetic recording medium, not more than 9 μm, is advantageous, because longer recording time is available. A thickness of the magnetic layer, not more than 2.5 μm, is advantageous in attaining a thinner magnetic recording medium as well as longer recording.

A thickness of a support, not more than 6.0 μm, is advantageous in attaining a thinner magnetic recording medium. The thickness of the support is preferably not less than 3.5 μm to ensure reasonable stiffness of the medium.

As described above, the materialization of the effects of the present invention can solve the dilemmatic problems of higher density magnetic recording media and thinner magnetic tapes versus higher durability of the media and prevention of data dropout as well as improvement of traveling properties. Next, the constituents of the invention are hereunder described in further detail.

The examples of magnetic metal powder include Fe, Ni, and Co; and Fe—Al, Fe—Al—Ni, Fe—Al—Co, Fe—Al—Zn, Fe—Ni—Co, Fe—Mn—Zn, Fe—Ni, Fe—Ni—Zn, and Fe—Co—Ni—Cr; and Fe—Co—Ni—P, and Co—Ni alloys. From the viewpoint of corrosion resistance and dispersibility, those preferred are Fe—Al, Fe—Al—Ni—, Fe—Al—Zn, Fe—Al—Co, and Fe—Ni series magnetic metal powder types. From the viewpoint of electrical properties, the preferred type is an Fe—Ni series magnetic powder.

Furthermore, the particularly preferred magnetic metal powder types are iron-aluminum series types (such as Fe—Al, Fe—Al—Ni, Fe—Al—Zn, and Fe—Al—Co). The iron-aluminum series magnetic powder is hereinafter simply called Fe—Al series.

Recently, video tapes are used in the diverse fields because of popularization of potable VTRs, and the tapes are subjected to various environmental conditions. Thus, the higher anti-environmental properties are required of the video tapes. In this regard, the Fe—Al series magnetic powder exhibits high aging durability as well as good dispersibility. These features are of great significance in attaining high density recording, since this type of magnetic powder even having a greater specific surface area can provide satisfactorily large dispersibility.

The Fe—Al series magnetic powder preferably contains Al of 0.5 to 20 atomic %. An Al content not less than 0.5 atomic % provides good aging durability as well as good dispersibility; while an Al content not more than 20 atomic % does not deteriorate electromagnetic conversion characteristics. The particularly preferred Al content is within a range of 1 to 8 atomic %.

The term "atomic %" mentioned above means a ratio of aluminum atoms per total metal atoms in a magnetic powder. An Al content of 1 atomic % means 1 part of Al atoms per 100 parts of total atoms of metal magnetic powder. The Fe—Al series may further contain other metal components such as Ni, Co, P, Mn, Zn and Cr. The metal magnetic powder of the invention exhibits what has been prepared by the dry reduction process where a metal oxide is reduced by hydrogen or the like, while metal powder obtainable from the wet reduction process by boron hydride or the like cannot afford to attain so excellent electrical properties and high durability as the invention.

According to the invention, the specific surface area of magnetic metal powder used can be, in terms of BET value, not less than 40 m²/g (preferably, not less than 50 m²/g), and, accordingly, powder can be filled in a magnetic layer at higher density. The preferred specific surface area is not more than 90 m²/g, in particular, within a range of 51 to 80 $m^2/g$. Thereby, higher density magnetic recording as well as a smoother surface of a magnetic layer is realized and excellent electromagnetic conversion properties such as a higher S/N ratio and higher output level are attained.

In the above description, the term "BET value" (specific surface area) means a surface area per unit weight. In measuring a specific surface area, powder is first subjected to deaeration with heating at approximately 250° C. for 30 to 60 minutes, thereby what have been absorbed on powder particles are eliminated, and then, the powder is introduced into a measuring apparatus, and measurement based on nitrogen adsorption is performed at a liquid nitrogen temperature ($-195°$ C.) with the initial nitrogen pressure of 0.5 $kg/m^2$ (measurement technique for specific surface area known as BET technique, for details, refer to Journal of American Chemical Society, 60 309 (1938). A measurement apparatus applicable to measuring the specific surface area (BET value) is "powder measurement apparatus, Countersorb, manufactured jointly by Yuasa Battery Co., Ltd. and Yuasa Ionics Co., Ltd.

Surface roughness Ra (average roughness or height of the axes of surface irregularities) on a magnetic layer, less than 0.010 $\mu m$ (preferably not more than 0.009 $\mu m$, and not less than 0.001 $\mu m$) results in smaller spacing loss between a magnetic head and a magnetic layer surface, and thereby higher S/N ratio and output level are attained.

As the result of employment of metal magnetic powder with finer particles therein, resultant smoother magnetic layer surface as well as thinner magnetic recording medium, however, may deteriorate, as previously described in the prior art section, the traveling stability and durability of the magnetic recording medium. Such high quality and high output level magnetic recording medium as the present invention intends to provide especially requires the solution to this problem.

In this regard, the magnetic recording medium of the invention has a BC layer on the face opposite to the magnetic layer, and this arrangement positively maintains the traveling stability of the medium. Additionally, since the surface roughness of the BC layer according to the invention is not less than 0.010 $\mu m$, the BC layer surface is appropriately coarse in contrast with the magnetic layer surface, whereby the friction resistance on the back face of the medium is reduced and stable traveling of a magnetic tape is available. This arrangement also prevents sticking of the tape. Therefore, the traveling stability and durability of the magnetic recording medium are maintained at satisfactory levels.

As described above, the embodiment of the present invention has technically solved the dilemmatic problems of higher density magnetic recording media and improved electromagnetic conversion properties versus higher durability and traveling stability of the magnetic recording medium.

Additionally, surface roughness (Ra) not more than 0.020 $\mu m$ on a BC layer is preferable since the roughness of the BC layer in this level does not affect harmfully the magnetic layer surface and electromagnetic conversion properties, especially luminance S/N, are free from deterioration.

To form a BC layer, a lubricating substance (for example, fatty acid, fatty acid derivative such as fatty acid ester; phosphoric acid ester, and fatty acid-modified silicon oil) is dissolved in an organic solvent and is applied directly or via subbing layer onto a support.

The BC layer may be composed of a binder containing an organic or inorganic filler, wherein the examples of the binders include a urethane resin, vinyl chloride, vinyl chloroacetate, and nitrocellulose. The examples of the filler include melamine resin powder, barium sulfate, carbon black, titanium oxide, calcium carbonate, zinc oxide, and graphite.

The average surface roughness Ra less than 0.005 $\mu m$ (Ra 0.005 $\mu m$) on the magnetic layer results in increasing the friction resistance, and it is difficult to reduce the dynamic friction coefficient of the magnetic layer. Accordingly, the preferred average surface roughness of the magnetic layer is not less than 0.005 $\mu m$.

The carbon black products that can be incorporated into the magnetic layer of the invention are those having an average size of 20 to 70 $m\mu$. and the examples include Conductex-SC. (BET value, hereinafter referred to as BET, 220 $m^2/g$; DBP oil absorption, hereinafter referred to as DBP, 115 ml/100 g; grain size, 20 $m\mu$), Conductex 975 (BET, 250 $m^2/g$; DBP, 170 ml/100 g; grain size, 24 $m\mu$), and Raven 14 (BET, 45 $m^2/g$; DBP, 111 ml/100 g; grain size, 59 $m\mu$), each manufactured by Columbia Carbon; Vulcan 9 (BET, 140 $m^2/g$; DBP, 114 ml/100 g; grain size, 19 $m\mu$), and Vulcan P (BET, 143 $m^2/g$; DBP, 118 ml/100 g; grain size, 20 $m\mu$), each manufactured by Cabot; #80 of Asahi Carbon (BET, 117 $m^2/g$; DBP, 113 ml/100 g; grain size, 23 $m\mu$); HS100 of DENKI KAGAKU (BET, 32 $m^2/g$; DBP, 180lml/100 g; grain size, 53 $m\mu$); #22B (BET, 55 $m^2/g$; DBP, 131 ml/100 g; grain size, 40 $m\mu$), #20B (BET, 56 $m^2/g$; DBP, 115 ml/100 g; grain size, 40 $m\mu$), and #3500 (BET, 47 $m^2/g$; DBP, 187 ml/100 g; grain size 40 $m\mu$), each manufactured by Mitsubishi Chemical Industries Ltd. Carbon blacks of average grain size 35 to 65 $m\mu$ are significantly effective in improving traveling characteristics of the magnetic tape. The other examples of a carbon black products that can be incorporated into the magnetic layer include CF-9, #4000, #40, #30, and MA-600, each manufactured by Mitsubishi Chemical Industries Ltd.; Black Pearls L, Monarck 800, Black Pearls 700, Black Pearls 1000, Black Pearls 880, Black Pearls 900, Black Pearls 1300, Black Pearls 2000, and Stealing V, each manufactured by Cabot; Raven 410 Raven 3200, Raven 420, Raven 1430, Raven 450, Raven 825, Raven 1255, Raven 1035, Raven 1000, Raven 2000, Raven 5000, Conductex 40-220, and Ketchen Black FC, each manufactured by Columbian Carbon.

The carbon black products that can be incorporated into the BC layer of the invention are those having an average size of 10 to 70 $m\mu$, and the examples include Conductex-SC. (BET value, hereinafter referred to as BET, 220 $m^2/g$; DBP oil absorption, hereinafter referred to as DBP, 115 ml/100 g; grain size, 20 $m\mu$); Conductex 975 (BET, 250 $m^2/g$; DBP, 170 ml/100 g; grain size, 24 $m\mu$), and Raven 14 (BET, 45 $m^2/g$; DBP, 111 ml/100 g; grain size, 59 $m\mu$), each manufactured by Columbia Carbon; Vulcan 9 (BET, 140 $m^2/g$; DBP, 114 ml/100 g; grain size, 19 $m\mu$), and Vulcan P (BET, 143 $m^2/g$; DBP, 118 ml/100 g; grain size 20 $m\mu$), each manufactured by Cabot; #80 of Asahi Carbon (BET, 117 $m^2/g$; DBP, 113 ml/100 g; grain size, 23 $m\mu$), HS100 of DENKI KAGAKU (BET, 32 $m^2/g$; DBP, 180 ml/100 g; grain size, 53 $m\mu$), #22B (BET, 55 $m^2/g$; DBP, 131 ml/100 g; grain size 40 $m\mu$), #20B (BET, 56 $m^2/g$; DBP, 115 ml/100 g; grain size 40 $m\mu$), and #3500 (BET, 47 $m^2/g$; DBP, 187 ml/100 g; grain size 40 $m\mu$), each manufactured by Mitsubishi Chemical Industries Ltd. The examples further include CF-9, #4000, #40,

30, and MA-600 of Mitsubishi Chemical Industries Ltd.; Black Pearls L, Monarck 800 (average grain size, 17 mμ), Black Pearls 700 (average grain size, 18 mμ), Black Pearls 1000 (average grain size, 16 mμ), Black Pearls 880 (average grain size, 16 mμ), Black Pearls 900 (average grain size, 15 mμ), Black Pearls 1300, Black Pearls 2000 (average grain size, 15 mμ), and Sterling V, each manufactured by Cabot; Raven 410, Raven 3200, Raven 420, Raven 1430, Raven 450, Raven 825, Raven 1255, Raven 1035, Raven 1000, Raven 2000 (average grain size, 19 mμ), Raven 5000 (average grain size, 12 mμ), Conductex 40-220, and Ketchen Black FC, each manufactured by Columbian Carbon. Additionally, a small amount of large grain carbon black with average particle size of 200 to 500 mμ can be added to the above mentioned carbon black with average particle size of 10 to 70 mμ in order to improve the traveling properties of the BC layer. The examples of the above-mentioned large grain carbon black include MT-P (280 mμ), and MT-Cl (350 ml), each manufactured by Columbian Carbon.

The above-mentioned "DBP oil absorption (DBP technique)" is measured by the following method; to 100 g pigment powder is added DBP (dibutyl phthalate) dropwise, and while kneading, the state of the pigment is observed. Then, the number in ml of DBP required for making the dispersed pigment one lump is determined and designated as the DBP oil absorption.

A preferred average size of non-magnetic particles that is incorporated into the BC layer is within a range of 10 mμ to 300 mμ. The particles to meet this range are not excessively fine, and can have favorable effect of addition.

The examples of the non-magnetic particles are silicon oxide, titanium oxide, aluminum oxide, chromium oxide, silicon carbide, calcium carbide, zinc oxide, α-Fe$_2$O$_3$, talc, kaoline, calcium sulfate, boron nitride, zinc fluoride, molybdenum dioxide, calcium carbide, and barium sulfate. The other examples of applicable non-magnetic particles include organic particles such as, benzoguanamine resin, and melamine resin; and phthalocyanine pigment. It is also possible to combinedly use organic powder and the above-mentioned inorganic powder.

The above-mentioned non-magnetic particles are preferably used together with carbon black. This arrangement enables further stabler traveling of a recording medium, and contributes to improving furthermore the durability of a recording medium by synergy with the previously mentioned action of non-magnetic particles.

Carbon black added to the BC layer can also improve light-shielding effect on the back coating layer, and thereby the optical density of the magnetic recording medium is improved. This feature in turn enables a thinner magnetic layer, and is more advantageous in attaining a longer recording.

Carbon black of light-shielding grade can further enhance the degree of light-shielding. The examples of applicable carbon black of light-shielding grade include Raven 2000 (specific surface area, 1190 m$^2$/g, grain size 18 mμ), Raven 2100, Raven 1170, and Raven 1000, each manufactured by Columbian Carbon; and #100, #75, #40, #35, and #30, each manufactured by Mitsubishi Chemical Industries Ltd.

The examples of electrical conductive carbon black include Conductex 975 (BET value, hereinafter referred to as BET, 250 m$^2$/g; DBP, hereinafter referred to as DBP, 170 ml/100 g; grain size, 24 mμ), Conductex 900 (BET, 125 m$^2$/g; grain size, 27 mμ), Conductex 40-220 (grain size, 20 mμ), Conductex SC (BET, 220 m$^2$/g; DBP, 115 ml/100 g; grain size, 20 mμ), each manufactured by Columbian Carbon; Vulcan XC-72 (specific surface area, 254 m$^2$/g; DBP, grain size, 30 mμ), and Vulcan P (BET, 143 m$^2$/g; DBP, 118 ml/100 g; grain size, 20 mμ), Raven 1040, Raven 420, Black Pearls (grain size, 15 mμ), each manufactured by Cabot; and #44 of Mitsubishi Chemical Industries Ltd.

The means for making the Young's modulus in a traveling direction of a recording medium not less than 1100 kg/mm$^2$ is hereunder described.

To increase the Young's modules of the recording medium, one possible way is to use a particular resin as a base film. The typical examples of such a resin are (a) and (b) below.

(a) Polyethylene naphthalates

Typical example of this type of resins is polythylene-2, 6-naphthalate

Polyethylene-2, 6-naphthalate is substantially composed of a repeating structural unit of ethylene-2, 6-naphthalenedicarboxylate, and it may include not only homopolymerized polyethylene-2, 6-naphthalenedicarboxylate, but also copolymers in which not more than 10%, preferably, not more than 5% of repeating structural units are modified with another component. It may also include the constituents and the mixtures of the other polymers.

Polyethylene-2,6-naphthalate can be synthesized by reaction of naphthalene-2-6-dicarboxylic acid or functional derivative thereof with ethylene glycol or functional derivative thereof under reasonable condition in the presence of a catalyst. Polyethylene-2,6-naphthalates may be copolymers or mixed polyesters prepared by adding one, or more third components (modifiers) before completion of polymerization of polyethylene-2,6-naphthalates.

The examples of the third components are compounds that have divalent ester forming functional groups, and such examples include dicarboxylic acids such as oxalic acid, adipic acid, phthalic acid, isophthalic acid, terephthalic acid, naphthalene-2,7-dicarboxylic acid, succinic acid, and diphenylether dicarboxylic acid, or lower alkyl esters thereof; oxycarboxylic acids such as p-oxysuccinic acid, p-oxyethoxysuccinic acid, and lower alkyl esters thereof; and divalent alcohols such as propylene glycol, and trimethylene glycol. Polyethylene-2,6-naphthalates or modified polymers thereof can be those whose terminal hydroxy group and/or carboxyl groups are blocked with monofunctional compound such as succinic acid, benzoyl succinic acid, benzyloxy succinic acid, and methoxypolyalkylene glycol, or can be what have been modified with a small amount of trifunctional or tetrafunctional ester forming compounds such as glycerine or pentaerythritol to form substantially linear copolymers.

The above-mentioned copolymers may contain a matting agent such as titanium dioxide, a stabilizer such as phosphoric/phosphorus acid or esters thereof and hindered phenol, and a lubricant such fine powder silica, china clay.

If the support is a polyethylene naphthalate film, the preferred film is a biaxially oriented film. The applicable techniques for producing the biaxially oriented film include the so-called longitudinal-latitudinal sequential stretching technique, where a non-stretched film is first stretched in a traveling (longitudinal) direction, then in a width (latitudinal) direction; latitudinal-longitudinal sequential stretching technique; longitudinal-latitudinal-longitudinal stretching technique and latitudinal-longitudinal-latitudinal stretching technique, where an ordinary biaxial stretched film is re-stretched; and simulataneous biaxially stretching technique. The invention is not particularly limited to any of these techniques.

A heat shrink ratio of a base film in the heat treatment for one hour at 70° C., without loading onto the film should be not more than 0.08%, preferably, not more than 0.06%. The heat shrink ratio in excess of 0.08% results in larger skew on a magnetic tape, and, the images displayed on a screen may be distorted, and the variable recorded data may be damaged.

The heat shrink ratio of a film of a higher Young's modulus can be decreased to this level by re-heating a film after heat treatment, with low tension applied and relaxing the film in the traveling direction. The techniques for relaxing the film in the traveling direction include a non-contact technique where a film is relaxed floating by air and heated with low tension applied; a relaxing technique where a film is subjected to different traveling speeds of a heating roller and cooling roller each having a nipping roller; and a technique where a film is relaxed in the traveling direction by gradually slowing the traveling speed of a clip that holds the film in a tenter. In essence, any technique that is capable of relaxing a film in the traveling direction can be employed for this purpose.

(b) Others; (1) polyamide resins

Any plastic, as far as it can provide a higher Young's modulus, can be used. However, aromatic polyamides (alamide resins)

are advantageous, because they provide films with significantly higher Young's moduli.

Compared with polyethylene naphthalate, the alamide resin is characterized in a higher Young's modulus of the resultant tape in a latitudinal direction. This means even a thinner film is significantly resistant to various latitudinal tensions possibly exerted by a driving mechanism.

For example, the comparison data of Young's moduli (kg/mm$^2$) of 5.5 μm thickness base films, in longitudinal/latitudinal directions are as follows:

| | |
|---|---|
| Polyethylene naphthalate | 1450/600 |
| Alamide | 1490/1300 |
| cf. Polyethylene terephthalate | 850/450 |

(b) (2) Other base films

The other types of base film materials, of which physical properties (for example, Young's modulus) are slightly inferior to those of polyethylene naphthalate or polyamide resin, may be used if inferior Young's modulus can be compensated by reinforcing it with a magnetic layer, and the examples of such other type base film materials are polyimide, polyether sulfone, and polyether ketone.

Among those of categories (a) and (b), particularly preferred are polyethylene naphthalate and polyamide, and they are excellent in attaining a higher Young's modulus.

One technique for improving Young's modulus is to reduce amounts of various additives in the magnetic and BC layers.

The preferred Young's modulus of a support in a traveling direction is 1200 to 1800 kg/mm$^2$; while that in a latitudinal direction is within a range of 500 to 1600 kg/mm$^2$.

The magnetic layer can contain a fatty acid and fatty acid ester. By doing so, the characteristics of both fatty acid and ester thereof are fully demonstrated, and the deficiency that will be otherwise manifest when both are independently employed is compensated by simultaneously using both fatty acid and ester thereof. Lubrication action is further enhanced by carbon black, and thereby still image durability, traveling stability and S/N ratio are further improved. For this purpose, the preferred amount of fatty acid added is within a range of 0.2 to 10 parts by weight, in particular, 0.5 to 8.0 parts by weight per 100 parts of magnetic powder. If the amount of fatty acid is lower than this range, the dispersibility of magnetic powder is smaller, and the traveling properties of a recording medium tends to become poor; if the amount is higher than this range, fatty acid tends to be eluted from a medium, and the output level tends to be lower. The preferred amount of fatty acid ester added is within a range of 0.1 to 10 parts by weight, in particular, 0.2 to 8.5 parts by weight per 100 parts of magnetic powder. If the amount of fatty acid ester is lower than this range, improvement on the traveling properties is less significant; if the amount is higher than this range, fatty acid ester tends to be eluted from the medium, and the output level tends to be lower.

To achieve the above effects more positively, the preferred weight ratio of fatty acid to fatty acid ester is 10/90 to 90/10. Fatty acid also has dispersing property, and it can contribute to decreasing amount of a low molecular weight dispersing agent used.

The fatty acids applicable for this purpose may be either monobasic or dibasic types. The preferred fatty acids independently have 6 to 30, particularly, 12 to 22 carbon atoms. The typical such fatty acids are as follows:

(1) caproic acid
(2) caprylic acid
(3) capric acid
(4) lauric acid
(5) myristic acid
(6) palmitic acid
(7) stearic acid
(8) isostearlic acid
(9) linolenic acid
(10) linolenic acid (11) oleic acid
(12) elaidic acid
(13) behenic acid
(14) malonic acid
(15) succinic acid
(16) maleic acid
(17) glutaric acid
(18) adipic acid
(19) pimelic acid
(20) azelaic acid
(21) sebacic acid
(22) 1,12-dodecandicarboxylic acid
(23) octanedicarboxylic acid The BC layer containing carbon black together with fatty acid and ester thereof can contribute to improving traveling stability and durability of a magnetic recording medium by synergistic effects. To sum up, a lubricating property of fatty acid improves the traveling properties of a magnetic layer, while a dispersion property of fatty acid is capable of decreasing or eliminating a conventional dispersing agent typified by lecithin, sorbitan derivative and phosphoric acid ester, and thereby stiffness of a magnetic layer is enhanced, and sticking on a back face of a magnetic layer is prevented by a BC layer, and a lubricating property of carbon black also can contribute to improving the traveling properties of a magnetic recording medium. Carbon black added to a BC layer can also improve light-shielding effect of a BC layer, and thereby an optical density of a magnetic recording medium is improved. This feature in turn enables a thinner magnetic layer and is more advantageous in attaining a longer recording operation.

Figure 1:
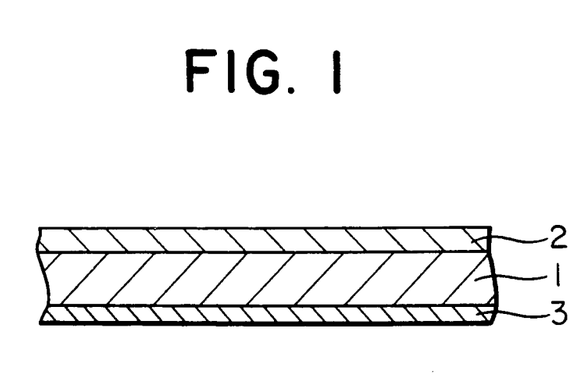
FIGS. 1 and 2 are the partially enlarged cross sections representing one example of a magnetic recording medium in the present invention.
Figure 2:
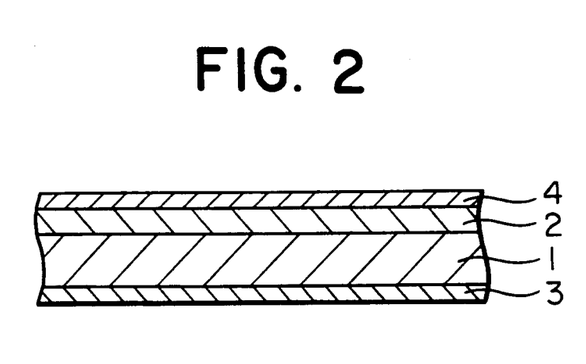

The examples of fatty acid ester are as follows:

(1) oleylolate
(2) isocetyl stearate
(3) dioleyl maleate
(4) butyl stearate
(5) butyl palmitate
(6) butyl myristate
(7) octyl myristate
(8) octyl palmitate
(9) amyl stearate
(10) amyl palmitate
(11) isobutyl oleate
(12) stearyl stearate
(13) lauryl oleate
(14) octyl oleate
(15) isobutyl oleate
(16) ethyl oleate
(17) isotridecyl oleate
(18) 2-ethylhexyl stearate
(19) ethyl stearate
(20) 2-ethylhexyl palmitate
(21) isopropyl palmitate
(22) isopropyl myristate
(23) butyl laurate
(24) cetyl-2-ethyl hexalate
(25) dioleyl adipate
(26) diethyl adipate
(27) diisobutyl adipate
(28) diisodecyl adipate A magnetic recording medium of the invention comprises, as shown in FIG. 1, a support 1 provided thereon a magnetic layer 2, and on an opposite face of the support 1 is provided a BC layer 3. As shown in FIG. 2, an over coating layer (OC layer) 4 may be additionally formed on the magnetic layer 2 of the magnetic recording medium in FIG. 1.

The magnetic recording medium either in FIG. 1 or FIG. 2 may have or may not have a subbing layer (unshown) between the magnetic layer 2 and the support 1. The support may be subjected to corona discharge treatment.

Besides above-exemplified fatty acids and fatty acid esters, the magnetic layer 2 may incorporate other lubricants such as silicon oil that is either carboxylic acid modified or ester modified; and graphite, fluorocarbon, molybdenum disulfide, tungsten disulfide, fatty acid amide and α-olefine oxide. This layer may also incorporate non-magnetic abrasive particles, and the examples of this abrasive include alumina, chromium oxide, titanium oxide, α-iron oxide, silicon oxide, silicon nitride, silicon carbide, zinc oxide, cerium oxide, magnesium oxide, and boron nitride. The preferred amount of the abrasive added is not more than 20 parts by weight, in particular, 3 to 12 parts by weight, per 100 parts of magnetic powder, and the preferred average particle size of such an abrasive is 0.4 μm, in particular, not more than 0.3 μm.

As a binder resin of a magnetic layer, one example is polyurethane, which can be synthesized by reaction of polyol with polyisocyanate. A phenoxy resin and/or vinyl chloride copolymer used together with polyurethane improves the dispersibility of magnetic powder, and thereby the mechanical strength of the layer increases. Solely using a phenoxy resin and/or vinyl chloride copolymer makes the layer excessively hard. However, this problem can be solved by adding polyurethane and the adhesion between the support and the subbing layer is improved. Besides the above examples, those possibly used as the binder resin are cellulose resins, thermoplastic resins, thermosetting resins, reactive resins, electron irradiation-curing resins.

The BC layer 3 can contain the above-mentioned lubricant, non-magnetic abrasive particles and binder resins.

The OC layer 4 shown in FIG. 2 is formed in order to protect the magnetic layer 2 from scratching. Accordingly, the OC layer 4 should have sufficient lubricating action. For this purpose, the above-mentioned urethane resin (preferably, in conjunction with the phenoxy resin and/or vinyl chloride copolymer) used in the magnetic layer 2 can be used as a binder resin.

As a binder resin for a magnetic layer, those in (A) through (D) below are preferably used. In these binder resins, the actions of the polar functional group in their structural chain contribute to improving the dispersibility of magnetic particles and preventing gelatinization of a coated layer, and thereby the amount of low molecular weight dispersing agent can be expected to decrease, which inturn contributes to improving coating layer strength and preventing magnetic head contamination resulting from bleeding-out of additives in the layer.

(A) Polyurethane resins containing metal sulfonate group

The example methods for introducing a metal sulfonate group into a polyurethane resin are as follows:
(1) method where the above-mentioned hydrophilic metal sulfonate group is in advance introduced into a dibasic acid or polyol.

(2) methods where a polyurethane resin having two or more —OH groups is modified. For example;

(a) a compound having in a molecular structure the above-mentioned hydrophilic group and a chlorine atom such as ClCH$_2$CH$_2$SO$_3$M (M represents a basic group, preferably an alkali metal group), and a polyurethane resin having multifunctional —OH are dissolved in a solvent, such as dimethylformamide (DMF) and dimethylsulfoxide (DMSO), which are capable of dissolving the above two components, and the above hydrophilic group is introduced into polyurethane resin by the dehydrochlorination reaction between —OH group and a chlorine atom in the presence of a dehydrochlorinating agent, of which examples are amines such as pyridine, picoline and triethylamine, and epoxy compounds such as ethylene oxide and propylene oxide.

R—OH+ClCH$_2$CH$_2$SO$_3$M→R—OCH$_2$CH$_2$SO$_3$M+HCl   (a-1)

(wherein R represents a polyurethane resin.) Though yielding a few amount of by-products, the following synthesizing methods are applicable, too.

(b) in a solvent such as dimethylformamide (DMF) and dimethylsulfoxide (DMSO), HOCH$_2$CH$_2$SO$_2$M is allowed to react with the equivalent mol of bifunctional isocyanate compound such as 4,4'-diphenylmethanediisocyanate (MDI), tolylenediisocyanate (TDI), and hexamethylenediisocyanate (HMDI), and thereby one isocyanate group in diisocyanate reacts with —OH group in the above-mentioned compound. Next, —OH group on the polyurethane resin reacts with the residual —NCO group to form a binder resin useful in embodying the invention.

OCN—R'—NCO + HOCH$_2$CH$_2$SO$_3$M ⟶
(b-1)

H
          |
OCN—R'—NCOOCH$_2$CH$_2$SO$_3$M

H
          |
R—OH + OCN—R'—NCOOCH$_2$CH$_2$SO$_3$M ⟶

H       H
       |       |
R—OCON—R'—NCOOCH$_2$CH$_2$SO$_3$M (wherein R represents a polyurethane resin; R', a hydrocarbon group). The following method is also applicable.

(c) method where a urethane polymer having —NCO on both ends is allowed to react with HOCH$_2$CH$_2$SO$_3$M The number average molecular weight of a resultant resin ranges from 10,000 to 100,000; the polymerization degree, from approx. 200 to 2,000; glass transition point is 0° to 90° C., wherein the resin has metal sulfonate group at a rate of 1,000 equivalent/100 g. The mechanical properties of the resin are as follows: initial elastic modulus, 20 to 200 kg/mm$^2$; breaking load, 2 to 10 kg/mm$^2$; and maximum elongation, 3 to 800%.

(B) Vinyl cloride-vinyl acetate copolymer resins containing maleic acid

The number average molecular weight of this type of resin ranges from 8,000 to 100,000; the average polymerization degree, from approx. 250 to 1,000; wherein the resin contains maleic acid at a rate of 0.2 to 1.5 wt %. The representative commercial names of this type of resin include VMCH, and VMCC (manufactured by U.C.C), and MPR-TM (manufactured by Nisshin Kagaku).

The above-mentioned vinyl cloride-vinyl acetate-maleic acid ternary copolymer may copolymerize or graft-polymerize with the monomers such as vinyl alcohol, maleic acid anhydride, acrylonitrile, acrylic, methacrylic acid and acrylic acid ester. The content of such a monomer in the above-mentioned copolymer is 0.1 to 25 wt %.

The mixing ratio of vinyl chloride to vinyl acetate, in terms of weight, is 60:40 to 95:5, or, preferably, 70:30 to 90:10.

Furthermore, "polyurethane resin containing a metal sulfonate group" in (A) and "vinyl-cloride-vinyl acetate copolymer resin containing maleic acid" in (B) can be mixedly used.

The mixing rates of these binder resins are as follows: that of vinyl chloride resin containing maleic acid is preferably 20 to 65 wt %, in particular, 30 to 55 wt %; and that of polyurethane containing metal sulfonate group is preferably 35 to 80 wt %, in particular, 45 to 70 wt %.

When the rate of vinyl chloride-vinyl acetate resin is less than 20 wt %, the dispersibility of the magnetic particles is poor; and the rate exceeding 65 wt % results in forming a magnetic tape of less strength, and falling off of the magnetic layer at slit portions.

If the mixing rate of polyurethane containing a metal sulfonate group is less than 25 wt %, adhesion between a magnetic layer and a support tends to be poor, while if the mixing rate exceeds 80 wt %, the surface properties of a magnetic layer tends to be poor, and sticking of a magnetic tape often occurs.

(C) Also are usable for magnetic paints the copolymer resins which are obtained by copolymerizing the monomers having a vinyl cloride group and an epoxy group, and if necessary, together with other monomers capable of polymerizing with these monomers, in the presence of a radical generating agent that has a strong acid root containing a sulfur or phosphorus atom, such as ammonium persulfate, potassium persulfate, ammonium perphosphate, and sodium perphosphate. The addition of such a radical generating agent is usually 0.3 to 9.0 wt %, or, preferably, 1.0 to 5.0 wt % per monomers.

This type of resins can be prepared by a known method. Since many of radical generating agents containing a sulfur or phosphorus atom are water soluble, these agents are conveniently prepared by emulsion polymerization or suspension polymerization in such lower alcohol as typified by methanol. Also, another preparation method is solution polymerization using a ketone solvent.

Besides the radical generating agents having a strong acid root containing a sulfur or phosphorus atom, the conventional radical generating agents for polymerization of vinyl chloride can be used. The examples of such radical generating agents include organic peroxides such as lauroyl peroxide, benzoyl peroxide, 3,5,5-trimethylhexanoyl peroxide, diisopropyl peroxydicarbonate, di-2-ethylhexyl peroxydicarbonate, di-2-ethoxyethyl peroxydicarbonate, t-butylperoxy piparate, and t-butylperoxy neodecanoate; and azo compounds such as 2,2'-azobisisobutylonitrile, 2,2'-azobis-2,4'-dimethylvaleronitrile, and 4,4'-azobis-4-cyanovaleric acid. A radical generating agent having a strong acid root can be used in conjunction with a reducing agent such as sodium formaldehydesulfoxylate, sodium sulfite, and sodium thiosulfate.

The examples of the monomers having an epoxy group include glycidylethers of unsaturated alcohols, as typified by allyl glycidyl ether, and methallyl glycidyl ether; glycydyl esters of unsaturated acids, as typified by glycidyl acrylate, glycidyl methacrylate, glycidyl-p-vinyl benzoate, methyl glycidyl itaconate, glycidyl ethyl maleate, glycidyl vinyl sulfonate, and glycidyl methallyl sulfonate; and epoxide olefines such as butadiene monoxide, vinyl cyclohexane monoxide, and 2-methyl-5, 6-epoxyhexene. This type of a monomer is usually added so that the rate of epoxy group in the resultant copolymer is not less than 0.5 wt %. At the rate less than 0.5 wt %, it is difficult to select the conditions for introducing a strong acid root.

The examples of the monomers used in conjunction with the monomers having a vinyl chloride and an epoxy group include vinyl carboxylate esters such as vinyl acetate, and vinyl propionate; vinyl ethers such as methyl vinyl ether, isobutyl vinyl ether, and cetyl vinyl ether; vinylidenes such as vinylidene chloride, and vinylidene fluoride; unsaturated carboxylate esters such as diethyl maleate, butyl benzyl maleate, di-2-hydroxyethyl maleate, dimethyl itaconate, methyl methacrylate, ethyl methacrylate, lauryl methacrylate, and 2-hydroxypropyl methacrylate; olefines such as ethylene, and propylene; unsaturated nitriles such as methacrylonitrile; aromatic vinyls such as styrene, α-methylstyrene, and p-methylstyrene. These monomers are arbitrarily used to meet the diverse requirements; for example, to adjust compatibility and softening points of the resultant mixture in mixing any of the previously exemplified resins with another type of resin and, to improve solubility of these resins; or to improve the layer properties and a coating process.

The example resins thus obtained have an average polymerization degree of 100 to 900, preferably, 200 to 500, and vinyl chloride content not less than 60 wt %. A polymerization degree of less than 100 results in insufficient abrasion resistance of a magnetic layer, and the degree in excess of 900 results in highly viscous paint and insufficiently dispersed magnetic particles. Meanwhile, the vinylchloride content less than 60 wt % deteriorates the compatibility of the resin with a flexible material.

The amount of the strong acid root bonded to the above resins has to be 0.1 to 4.0 wt % in the form of $-SO_3$, $-SO_4$, $-PO_4$. If the amount is less than 0.1 wt %, the dispersibility of magnetic particles is insufficient; while the amount in excess of 4.0 wt % promotes the hydrophilic property of a strong acid group, which results in flocculating the magnetic particles and decreasing the moisture resistance of the coated layer.

Further, the example resins containing an epoxy group exhibits excellent heat stability. Accordingly, it is possible to manufacture magnetic recording media of high reliability and less corrosive to a magnetic head. Also, the reactivity of an epoxy group makes it possible to crosslink a coated resin with a crosslinking agent such as polyamine or polycarboxylic acid compounds. Such a crosslinking agent accelerates crosslinking of the above resins more rapidly than that of conventional vinyl chloride copolymer with an epoxy group and without a strong acid root. The reason of such rapid crosslinking is still unknown. One possible reason is an acceleration by a strong acid group bonded to the resin.

(D) Modified polyurethanes containing not less than 0.1 meq/gr of one or more functional groups selected from carboxyl group, epoxy group and hydroxy group, wherein one molecule of ployurethane contains not less than 3 in average (preferably not less than 5) of functional groups; and modified polyurethane containing not only a sulfon group, but also an epoxy group and/or hydroxy group:

This type of resin have an average molecular weight of 5,000 to 100,000, or, preferably, 8,000 to 60,000. While the conventional thermoplastic polyurethane resins have hydroxy groups only on terminals of a molecular structure, these modified polyurethane resins have polar functional groups inter a molecular structure. Accordingly, such polyurethane is readily adsorbed on fine magnetic particles, and wettability of the particles is improved. Thus, the dispersibility of the particles is also improved. The modified polyurethane resins having a hydroxy groups are preferably what have been formed by opening with amines and/or carboxylic acids the epoxy rings of the polyurethatne resins modified with epoxides, and contain hydroxy groups not less than 0.1 meg/gr in a molecular chain, as well as functional groups not less than 3, preferably not less than 5, wherein an average molecular weight is 5,000 to 100,000, preferably 8,000 to 60,000; the epoxy resin component is represented by the following general formula [I]:

($R_1$ and $R_2$ independently represent a hydrogen atom, or methyl group; n represents 0, or an integer 1 or greater).

Particularly, the bisphenol structure can contribute to adjusting the hydrolysis resistance and the hardness of a coated layer on a magnetic tape. If the content of functional groups is less than 0.1 meq/g, it is difficult to disperse thoroughly the fine magnetic powders.

The typical examples of a modified polyurethane resin containing carboxyl groups are lysine-modified or lysine salt (lysine alkali salt, lisinate of organic cation) modified resins; and resins modified with those represented by general formula [II];

(wherein $R_3$ represents an alkyl group having 1 to 6 carbon atoms); or resins modified with 2-hydroxypropane 1, 3-diol or the salts (carboxylates) thereof Lysine modification, and 2-carboxypropane diol modification are described in detail in Japanese Patent Examined Publication Nos. 15517/1971 and 38760/1978. The other modified resins are described in Japanese Patent Examined Publication No. 41607/1980.

Among resins of (A) through (D), the urethane resins of (A) and (D) and the vinyl chloride resins of (C), as well as the vinyl chloride-vinyl acetate resins of (B) can be arbitrarily combined and used. The preferred combination ratio of (A)/(C) or (D)/(C) and/or (D)/(B) is 20/80 to 80/20 (wt %). The resins of (C) may be vinyl chloride-vinyl acetate copolymers. Additionally, conventional urethane or vinyl chloride vinyl acetate resins can be combinedly used.

When forming a magnetic layer by coating, a multifunctional isocyanate as a crosslinking agent is preferably added to a resin in a prescribed amount in order to strengthen the magnetic layer. The examples of such crosslinking agents include triphenylmethanetriisocyanate, tris-(p-isocyanatephenyl)thiophosphate, and polymethylenepolyphenylisocyanate. Those preferable are methylenediisocyanate, and tolylenediisocyanate. When curing a magnetic layer by electron beam irradiation, an isocyanate compound may be or may not be added to the layer.

EXAMPLES

The examples of the present invention are hereunder described.

The compositions, ratios, operation procedures described below may be variously modified without deviating from the scope of the invention. Incidentally, the term "part" in the following examples always means "part by weight".

Experiment 1

The magnetic tapes (shown in FIG. 1) specified in Table 1 were prepared by individually forming a magnetic layer and a BC layer on a support according to the following procedures. However, the magnetic tape in Comparative Example 2 has no BC layer.

First, the base films of prescribed thicknesses serving as a support were made of resins shown in Table 1.

Next, Fe—Al magnetic powder and the ingredients listed in Table 1 were dispersed, and the resultant magnetic paints were filtered through a 1 μm sieve filter, and then 5 parts multifunctional isocyanate was added, and thereafter the support was coated with the resultant dispersion in a thickness of 2.3 μm and treated with a super calender. Thus, the magnetic layers having the properties and compositions shown in Table 1 were formed. In Example 4, Fe—Al—Ni magnetic metal powder (Al, 6 atomic %; Ni, 1 atomic %; and remainder Fe) was used.

Next, the BC layer paint of the following composition was coated on an opposite face of a magnetic layer to form a dry coating layer of 0.4 μm thickness.

| Carbon black | Prescribed amount |
| --- | --- |
| Nitrocellulose | 25 parts |
| N-2301 (Nippon Polyurethane) | 25 parts |
| Coronate L (Nippon Polyurethane) | 25 parts |
| Cyclohexanone | 400 parts |
| Methyl ethyl ketone | 250 parts |
| Toluene | 250 parts |

Thus, the wide magnetic respectively having a magnetic layer and BC layer of prescribed thicknesses were prepared and rolled up. A respective magnetic film was cut into 8 mm width tapes to form the video tapes. For testing scratching frequency on the tapes, ½ inch (12.65 mm) width tapes were used.

The evaluation results of the tapes made by the preceding process are summarized in Table 1. The evaluation items were measured by the following methods.

Young's modulus:

A sample of 10 mm width, and 15 cm length was subjected to a stretching test by a universal tensionmeter of an Instron type, at a stretching rate of 10 mm/minute with the initial distance of 100 mm between chacks, and a chart speed of 500 mm/minute. The Young's modulus (1%) of each sample was arithmetically determined based on the load at the 1% elongation point on the resultant load-elongation curve.

Luminance S/N:

was determined using a color video noise meter "Shibasoku, Model 925 D/1". The threshold level of the high-pass filter was 4.2 MHz; that of the low-pass filter was 10 KHz. The VTR used was an 8 mm video deck. The luminance S/N ratios obtained are the values relative to that of on Comparative Example 1, which is set at 0 dB.

RF output loss:

Using an 8 mm video deck, RF output levels were measured, and thereby the deviation of the output level after 100 times of reproducing operation from the initial output level was determined (unit, dB)

Still image duration:

This is a duration, represented in minutes, when the level of a still image decreases by 2 dB. The larger the level is, the greater the durability and abrasion resistance of the magnetic recording medium.

Tape scratching frequency:

The magnetic tape being tested was loaded into a commercially available VHS type VTR, and the tape was allowed to run for 1 minute. Next, the traveling operation was terminated and the tape was unloaded, and then the areas subjected to loading and unloading operations as well as traveling were visually examined to check if there were scratches on the tape surface. The frequency was determined by the following expression;
Tape scratching frequency = number of scratches/number of test × 100 (%)

The number of tests was more than 20.

Saturated magnetization:

The saturated magnetization of the sample tape is denoted in Gauss unit.

Saturated magnetization residual rate:

The sample tape was allowed to stand for 1 week at the conditions of 60° C. and 80%RH, and then the saturated magnetization was measured. The residual magnetization is represented by percentage of the saturated magnetization after aging to the initial saturated magnetization.

TABLE 1

| | | | Example 1 | Example 2 | Example 3 | Example 4 | Comparison 1 |
| --- | --- | --- | --- | --- | --- | --- | --- |
| Composi- | Magnetic | Composition and | 100 parts | 100 parts | 100 parts | 100 parts | 100 parts |
| posi- | paint | ingredients | Hc1480oe | Hc1490oe | Hc1480oe | FE—Al—Ni | Hc1510oe |

TABLE 1-continued

| tion and ingredients | compo- sition | | (Fe—Al) (Al, 4 atomic %) | (Al, 7 atomic %) | (Al, 10 atomic %) | Hc1580oe (Al, 6 atomic % Ni, 1 atomic %) | (Fe—Al) (Al, 4 atomic %) |
|---|---|---|---|---|---|---|---|
| | | Vinyl chloride copolymer (containing hydroxide group, epoxy group, and potassium sulfonate salt) | 13 parts | 13 parts | 13 parts | 13 parts | 13 parts |
| | | Polyurethane (containing hydroxy group) | 10 parts | 10 parts | 10 parts | 10 parts | 10 parts |
| | | Alumina (avg. grain size, 0.20 m) | 5 parts | 5 parts | 5 parts | 5 parts | 5 parts |
| | | Cyclohexanone | 15 parts | 15 parts | 15 parts | 15 parts | 15 parts |
| | | Toluene | 100 parts | 100 parts | 100 parts | 100 parts | 100 parts |
| | | Lecithin | 4 parts | 4 parts | 4 parts | 4 parts | 4 parts |
| | | Stearic acid | 2 parts | 2 parts | 2 parts | 2 parts | 2 parts |
| | | Butyl stearate | 1 part | 1 part | 1 part | 1 part | 1 part |
| | | Carbon black | 5 parts (Ave. grain size: 53 mμ) | 5 parts (Ave. grain size: 75 mμ) | 5 parts (Ave. grain size: 37 mμ) | 1 part (Ave. grain size: 22 mμ) | — |
| | Presence of BC layer | | Yes | Yes | Yes | Yes | Yes |
| | Carbon black in BC layer | | 40 parts | 40 parts | 40 parts | 40 parts | 40 parts potassium carbonate |
| | Support material | | PEN | Polyamide | Polyamide | Polyamide | PEN |
| | Support thickness (μm) | | 5.0 | 4.5 | 4.5 | 4.0 | 5.0 |
| | Young's modulus in medium's traveling direction (kg/mm²) | | 1170 | 1420 | 1300 | 1490 | 1270 |
| | Young's modulus in medium's width direction (kg/mm²) | | 730 | 1130 | 1280 | 1220 | 700 |
| Luminance S/N ratio (dB) | | | +0.7 | +1.7 | +1.5 | +1.4 | 0 |
| RF output loss (dB) | | | −1.2 | −0.5 | −0.7 | −1.0 | −2.5 |
| Still image duration (min.) | | | 60 or longer | 60 or longer | 60 or longer | 60 or longer | 60 or longer |
| Tape scratching frequency (%) | | | 5 | 0 | 5 | 0 | 20 |
| Saturated magnetization (Gauss) | | | 2940 | 2780 | 2730 | 2640 | 2870 |
| Saturated magnetization residual rate (%) | | | 92 | 94 | 95 | 93 | 92 |

| | | | Comparison 2 | Comparison 3 | Comparison 4 | Comparison 5 |
|---|---|---|---|---|---|---|
| Com- posi- tion and ingre- dients | Magnetic paint compo- sition | Composition and ingredients | 100 parts Hc1480oe (Fe—Ni) | 100 parts Hc1480oe (Fe—Ni) | 100 parts Hc1480oe (Fe—Ni) | 100 parts Hc1480oe (Fe—Ni) |
| | | Vinyl chloride copolymer (containing hydroxide group, epoxy group, and potassium sulfonate salt) | 13 parts | 13 parts | 13 parts | 13 parts |
| | | Polyurethane (containing hydroxy group) | 10 parts | 10 parts | 10 parts | 10 parts |
| | | Alumina (avg. grain size, 0.20 m) | 5 parts | 5 parts | 5 parts | 5 parts |
| | | Cyclohexanone | 15 parts | 15 parts | 15 parts | 15 parts |
| | | Toluene | 100 parts | 100 parts | 100 parts | 100 parts |
| | | Lecithin | 4 parts | 4 parts | 4 parts | 4 parts |
| | | Stearic acid | 2 parts | 2 parts | 2 parts | 2 parts |
| | | Butyl stearate | 1 part | 1 part | 1 part | 1 part |
| | | Carbon black | 5 parts (Ave. grain size: 53 mμ) | 5 parts (Ave. grain size: 53 mμ) | No | 5 parts (Ave. grain size: 53 mμ) |
| | Presence of BC layer | | No | Yes | Yes | Yes |
| | Carbon black in BC layer | | — | 40 parts | 40 parts | 40 parts calcium carbide |
| | Support material | | PEN | PEN | Polyamide | Polyamide |
| | Support thickness (μm) | | 5.0 | 5.5 | 4.5 | 4.5 |
| | Young's modulus in medium's traveling direction (kg/mm²) | | 1190 | 890 | 1260 | 1320 |
| | Young's modulus in medium's width direction (kg/mm²) | | 690 | 420 | 1130 | 1280 |
| Luminance S/N ratio (dB) | | | −0.3 | −1.8 | +1.0 | −0.1 |
| RF output loss (dB) | | | −3.5 | −3.3 | −3.0 | −2.3 |
| Still image duration (min.) | | | 60 or longer | 45 | 60 or longer | 60 or longer |
| Tape scratching frequency (%) | | | 60 | 70 | 10 | 40 |
| Saturated magnetization (Gauss) | | | 2930 | 2880 | 2840 | 2910 |
| Saturated magnetization residual rate (%) | | | 85 | 82 | 83 | 84 |

It is obvious from the data summarized in Table 1 that the properties of the magnetic tapes have remarkably been improved by taking the following procedures in combination according to the present invention;

Incorporating caron black into a magnetic layer and a BC layer.

Applying a support having Young's modulus not less than 1,100 kg/mm².

It is also obvious that using Fe—Al magnetic powder as magnetic metal powder results in a higher saturated magnetization residual rate, that is, improved aging durability of the recording media.

Next, using the magnetic tape of Example 1 and that of Comparison 1, the following test was performed.

Falling-off of dust after durability test

The magnetic tape was subjected to repeating recording-playback of 2,000 times at a normal temperature and normal humidity, and then, the dust accumulated in the tape travel area on the video tape deck was collected, and the degree of contamination by dust was visually evaluated.

As the result of the above test, the magnetic tape of Comparison 1 resulted in apparent accumulation of dust while any contamination by dust was observed in the magnetic tapes of Example 1.

Experiment 2

-continued

| | |
|---|---|
| N-2301 (Nippon Polyurethane) | 25 parts |
| Coronate L (Nippon Polyurethane) | 10 parts |
| Cyclohexanone | 400 parts |
| Methyl ethyl ketone | 250 parts |
| Toluene | 250 parts |

Thus, the wide magnetic films having a magnetic layer and BC layer of prescribed thicknesses were prepared and rolled up. A respective magnetic film was cut into 8 mm wide tape to form the video tapes. For testing scratching frequency on the tapes, ½ inch (12.65 mm) width tapes were used.

The evaluation results of the tapes made by the preceding process are summarized in Table 2. The evaluation items were measured by the same methods as in Experiment 1. The luminance S/N ratios and RF output losses obtained are the values relative to those of Comparison 7, which is set at 0 dB.

TABLE 2

| | | | Example 5 | Example 6 | Example 7 | Comparison 6 | Comparison 7 | Comparison 8 | Comparison 9 | Comparison 10 |
|---|---|---|---|---|---|---|---|---|---|---|
| Composition and ingredients | Magnetic paint composition | Ferromagnetic powder | 100 parts (Fe—Ni) | 100 parts (Fe—Ni) | 100 parts (Fe—Ni) | 100 parts (Fe—Ni) | 100 parts (Fe—Ni) | 100 parts (Fe—Ni) | 100 parts (Fe—Ni) | 100 parts (Fe—Ni) |
| | | Hc1480 (oersted) BET value | 51 $m^2$/gr | 53 $m^2$/gr | 60 $m^2$/gr | 38 $m^2$/gr | 53 $m^2$/gr | 53 $m^2$/gr | 53 $m^2$/gr | 53 $m^2$/gr |
| | | Vinyl chloride copolymer (containing potassium sulfonate salt) | 13 parts | 13 parts | 13 parts | 13 parts | 13 parts | 13 parts | 13 parts | 13 parts |
| | | Polyurethane | 10 parts | 10 parts | 10 parts | 10 parts | 10 parts | 10 parts | 10 parts | 10 parts |
| | | Alumina | 5 parts | 5 parts | 5 parts | 5 parts | 5 parts | 5 parts | 5 parts | 5 parts |
| | | Myristic acid | 2 parts | 2 parts | 2 parts | 2 parts | 2 parts | 2 parts | 2 parts | 2 parts |
| | | Butyl stearate | 1 part | 1 part | 1 part | 1 part | 1 part | 1 part | 1 part | 1 part |
| | | Lecithin | 4 parts | 4 parts | 4 parts | 4 parts | 4 parts | 4 parts | 4 parts | 4 parts |
| | | Cyclohexanone | 150 parts | 150 parts | 150 parts | 150 parts | 150 parts | 150 parts | 150 parts | 150 parts |
| | | Toluene | 100 parts | 100 parts | 100 parts | 100 parts | 100 parts | 100 parts | 100 parts | 100 parts |
| | Resin for support | | PEN | PEN | PEN | PEN | PET | PEN | PEN | PEN |
| | Average surface roughness of magnetic layer Ra ($\mu$m) | | 0.007 | 0.007 | 0.009 | 0.007 | 0.007 | 0.011 | 0.007 | 0.007 |
| | Average surface roughness of BC layer Ra ($\mu$m) | | 0.015 | 0.015 | 0.015 | 0.015 | 0.015 | 0.015 | 0.009 | — |
| | Presence of BC layer | | Yes | Yes | Yes | Yes | Yes | Yes | Yes | No |
| Luminance S/N ratio (dB) | | | +3.5 | +3.0 | +4.0 | +1.0 | 0 | +1.5 | +2.0 | −1.0 |
| RF output loss (dB) | | | +2.0 | +2.5 | +2.3 | +2.0 | 0 | +2.0 | +1.0 | −3.0 |
| Still image duration (min.) | | | 60 or longer | 60 or longer | 60 or longer | 60 or longer | 35 | 60 or longer | 60 or longer | 40 |
| Tape scratching frequency (%) | | | 5 | 0 | 0 | 0 | 70 | 0 | 30 | 90 |

The magnetic tapes shown in FIG. 1 were prepared by individually forming a magnetic layer and a BC layer on a support according to the following procedures. However, the magnetic tape in Comparison 10 has no BC layer.

First, the base films of 4.3 $\mu$m thickness serving as a support were made of, as listed in Table 2, polyethylene naphthalate (PEN) or polyethylene terephthalate (PET).

Next, the ingredients listed in Table 2 were dispersed, and the resultant magnetic paints were independently filtered through a 1 $\mu$m sieve filter, and then 5 parts multifunctional isocyanate were added. Thereafter the support was coated with the resultant dispersion and treated with a super calender Thus, the magnetic layers (2.5 $\mu$m thickness) having the properties and compositions listed in Table 2 were formed.

Next, the BC layer paint of the following composition was coated on an opposite face of a magnetic layer to form a dry coating layer of 0.4 $\mu$m thickness.

| | |
|---|---|
| Carbon black | Amount specified in Table 2 |
| Titanium oxide | 10 parts |
| Nitrocellulose | 25 parts |

It is abvious from the data summarized in Table 2 that the properties of the magnetic tapes have markedly been improved by taking the following procedures in combination according to the present invention;

Making a base film of polyethylene naphthalate (PEN).

Using magnetic metal powder of BET value not less than 50 $m^2$/gr.

Adjusting the surface roughness (Ra) of a magnetic layer to less than 0.010 $\mu$m.

Adjusting the surface roughness (Ra) of a BC layer to not less than 0.010 $\mu$m.

Experiment 3

The magnetic tapes shown in FIG. 1 were prepared by individually forming a magnetic layer and a BC layer on a support according to the following procedures. However, the magnetic tape in Comparison 14 has no BC layer.

First, the base films of 4.3 $\mu$m thickness serving as a support were made of, as listed in Table 3, polyethylene naphthalate (PEN) or polyethylene terephthalate (PET).

Next, the ingredients listed in Table 3 were dispersed, and the resultant magnetic paints were independently filtered through a 1 μm sieve filter, and then 5 parts multifunctional isocyanate was added. Thereafter, the support was coated with the resultant dispersion and treated with a super calender. Thus, the magnetic layers (2.5 μm thickness) having the properties and compositions listed in Table 3 were formed.

Next, the BC layer paint of the following composition was coated on an opposite face of a magnetic layer to form a dry coating layer of 0.4 μm thickness.

| | |
|---|---|
| Carbon Black | Amount specified in Table 3 |
| Titanium oxide | 10 parts |
| Nitrocellulose | 25 parts |
| N-2301 (Nippon Polyurethane) | 25 parts |
| Coronate L (Nippon Polyurethane) | 10 parts |
| Cyclohexanone | 400 parts |
| Methyl ethyl ketone | 250 parts |
| Toluene | 250 parts |

Thus, the wide magnetic films having a magnetic layer and BC layer of prescribed thicknesses were prepared and rolled up. A respective magnetic film was cut into 8 mm wide tapes to form the video tapes. For testing scratching frequency on the tapes, ½ inch (12.65 mm) width tapes were used.

The evaluation results of the tapes made by the preceding process are summarized in Table 3. The evaluation items were measured by the same methods as Experiment 1.

The luminance S/N ratios and RF output losses obtained are the values relative to those of Comparison 13, which is set at 0 dB.

Experiment 4

The magnetic tapes shown in FIG. 1 were prepared by individually forming a magnetic layer and a BC layer on a support according to the following procedures. However, the magnetic tape in Comparison 18 has no BC layer.

First, the base films of 4.5 μm thickness serving as a support were made of, as listed in Table 4, polyethylene naphthalate (PEN) or polyethylene terephthalate (PET).

Next, the ingredients listed in the Table 4 were dispersed, and the resultant magnetic paints were independently filtered through a 1 μm sieve filter, and then 5 parts multifunctional isocyanate were added. Thereafter the support was coated with the resultant dispersion and treated with a super calender. Thus, the magnetic layers (2.5 μm thickness) having the properties and compositions listed in Table 4 were formed.

The Al contents in the magnetic metal powders were 5 atomic % (hereinafter, referred to simply as %) (Examples 11 and 14), 3% (Example 12), 8% (Example 13), and 5% (Comparison 20).

Next, the BC layer paint of the following composition was coated onto an opposite face of a magnetic layer to form a dry coating layer of 0.4 μm thickness.

| | |
|---|---|
| Carbon black (average grain size, 50 mμ) | Specified in Table 4 |
| Inorganic non-magnetic powder | Specified in Table 4 |
| Nitrocellulose | 25 parts |
| N-2301 (Nippon Polyurethane) | 25 parts |
| Coronate L (Nippon Polyurethane) | 10 parts |
| Cyclohexanone | 400 parts |

TABLE 3

| | | | Example 8 | Example 9 | Example 10 | Comparison 11 | Comparison 12 | Comparison 13 | Comparison 14 | Comparison 15 |
|---|---|---|---|---|---|---|---|---|---|---|
| Composition and ingredients | Magnetic paint composition | Ferromagnetic powder | 100 parts (Fe—Ni) | 100 parts (Fe—Ni) | 100 parts (Fe—Ni) | 100 parts (Fe—Ni) | 100 parts (Fe—Ni) | 100 parts (Fe—Ni) | 100 parts (Fe—Ni) | 100 parts (Fe—Ni) |
| | | Hc1480 (oersted) BET value | 50 m²/gr | 42 m²/gr | 50 m²/gr | 38 m²/gr | 42 m²/gr | 42 m²/gr | 42 m²/gr | 50 m²/gr |
| | | Vinyl chloride copolymer (containing potassium sulfonate salt) | 13 parts | 13 parts | 13 parts | 13 parts | 13 parts | 13 parts | 13 parts | 13 parts |
| | | Polyurethane | 10 parts | 10 parts | 10 parts | 10 parts | 10 parts | 10 parts | 10 parts | 10 parts |
| | | Alumina | 5 parts | 5 parts | 5 parts | 5 parts | 5 parts | 5 parts | 5 parts | 5 parts |
| | | Butyl stearate | 1 part | 1 part | 1 part | 1 part | 1 part | 1 part | 1 part | 1 part |
| | | Carbon black | 1 part | 1 part | 1 part | 1 part | 1 part | 1 part | 1 part | 1 part |
| | | Oleic acid | 4 parts | No | No | No | Lecithin, 4 parts | No | No | Lecithin, 4 parts |
| | | Cyclohexanone | 150 parts | 150 parts | 150 parts | 150 parts | 150 parts | 150 parts | 150 parts | 150 parts |
| | | Toluene | 100 parts | 100 parts | 100 parts | 100 parts | 100 parts | 100 parts | 100 parts | 100 parts |
| | | Myristic acid | No | 2 parts | 2 parts | 2 parts | — | 2 parts | No | No |
| | Resin for support | | PEN | PEN | PEN | PEN | PEN | PET | PEN | PEN |
| | Presence of BC layer | | Yes | Yes | Yes | Yes | Yes | Yes | No | Yes |
| | Carbon black in BC layer | | 40 parts | 40 parts | 40 parts | 40 parts | 40 parts | 40 parts | — | 40 parts |
| Luminance S/N ratio (dB) | | | +3.5 | +2.5 | +3.0 | +1.5 | −0.5 | 0 | −1.5 | −1.0 |
| RF output loss (dB) | | | +1.8 | +1.9 | +1.7 | +1.8 | +1.0 | 0 | −4.0 | −1.0 |
| Still image duration (min.) | | | 60 or longer | 60 or longer | 60 or longer | 60 or longer | 22 | 40 | 60 or longer | 17 |
| Tape scratching frequency (%) | | | 0 | 0 | 0 | 0 | 80 | 65 | 90 | 85 |

It is evident from the data summarized in Table 3 that the properties of magnetic tapes have markedly been improved by taking the following procedures in combination according to the present invention;
- Making a base film of polyethylene naphthalate (PEN).
- Incorporating a fatty acid into a magnetic layer.
- Using magnetic metal powder of BET value not less than 40 m²/gr.
- Incorporating carbon black into a BC layer.

| | |
|---|---|
| Methyl ethyl ketone | 250 parts |
| Toluene | 250 parts |

Thus, the wide magnetic films having a magnetic layer and BC layer of prescribed thicknesses were prepared and rolled up. A respective magnetic film was cut into 8 mm wide tapes to form the video tapes.

For testing scratching frequency on the tapes, ½ inch (12.65 mm) wide tapes were used.

The evaluation results of the tapes made by the preceding procedures are summarized in Table 4. The evaluation item were measured by the same methods as in Experiment 1.

TABLE 4

|  |  |  | Example 11 | Example 12 | Example 13 | Example 14 | Comparison 16 | Comparison 17 | Comparison 18 | Comparison 19 | Comparison 20 |
|---|---|---|---|---|---|---|---|---|---|---|---|
| Composition and ingredients | Magnetic paint composition | Ferromagnetic powder (composition) (BET value) | 100 parts (Fe—Al) (45 m²/gr) | 100 parts (Fe—Al) (52 m²/gr) | 100 parts (Fe—Al) (41 m²/gr) | 100 parts (Fe—Al) (41 m²/gr) | 100 parts (Fe—Al) (41 m²/gr) | 100 parts (Fe—Al) (41 m²/gr) | 100 parts (Fe—Al) (41 m²/gr) | 100 parts (Fe—Al) (41 m²/gr) | 100 parts (Fe—Al) (41 m²/gr) |
|  |  | Vinyl chloride coplymer | 13 parts | 13 parts | 13 parts | 13 parts | 13 parts | 13 parts | 13 parts | 13 parts | 13 parts |
|  |  | Polyurethane | 10 parts | 10 parts | 10 parts | 10 parts | 10 parts | 10 parts | 10 parts | 10 parts | 10 parts |
|  |  | Alumina | 5 parts | 5 parts | 5 parts | 5 parts | 5 parts | 5 parts | 5 parts | 5 parts | 5 parts |
|  |  | Cyclohexanone | 150 parts | 150 parts | 150 parts | 150 parts | 150 parts | 150 parts | 150 parts | 150 parts | 150 parts |
|  |  | Toluene | 100 parts | 100 parts | 100 parts | 100 parts | 100 parts | 100 parts | 100 parts | 100 parts | 100 parts |
|  |  | Oleic acid (fatty acid) | 3 parts | 3 parts | 3 parts | 3 parts | 3 parts | 3 parts | 3 parts | 3 parts | 3 parts |
|  |  | Stearic acid | 2 parts | 2 parts | 2 parts | 2 parts | 2 parts | 2 parts | 2 parts | 2 parts | 2 parts |
|  |  | Butyl stearate | 1 part | 1 part | 1 part | 1 part | 1 part | 1 part | 1 part | 1 part | 1 part |
|  | Presence of BC layer |  | Yes | Yes | Yes | Yes | Yes | Yes | No | Yes | Yes |
|  | Carbon black in BC layer |  | 40 parts | 40 parts | 40 parts | 40 parts | 40 parts | 40 parts | — | 40 parts | 40 parts |
|  | Inorganic non-magnetic particles in BC layer (average grain size, μm) |  | Barium sulfate, 10 parts 0.2 | -iron oxide 0.3 | Calcium carbonate 0.2 | Zinc oxide 0.2 | Barium sulfate, 10 parts 0.2 | — | — | Barium sulfate, 10 parts 0.2 | Barium sulfate, 10 parts 0.2 |
|  | Support material |  | PEN | PEN | PEN | PEN | PEN | PEN | PEN | PET | PET |
| Luminance S/N ratio (dB) |  |  | +1.0 | +0.5 | +1.0 | +1.5 | 0 | −0.5 | −2.0 | −2.5 | −1.0 |
| RF output loss (dB) |  |  | −0.7 | −0.5 | −0.8 | −0.3 | −1.1 | −1.5 | −3.5 | −3.0 | −2.5 |
| Still image duration (min.) |  |  | 60 or longer | 60 or longer | 60 or longer | 60 or longer | 35 | 20 | 17 | 13 | 25 |
| Tape scratching frequency (%) |  |  | 0 | 5 | 5 | 0 | 10 | 15 | 30 | 70 | 50 |
| Saturated magnetization (Gauss) |  |  | 2830 | 2990 | 2750 | 2780 | 2780 | 2930 | 2830 | 2810 | 2820 |
| Saturated magnetization residual rate (%) |  |  | 95 | 93 | 95 | 94 | 88 | 87 | 89 | 89 | 95 |

It is evident from the data summarized in Table 4 that the properties of the magnetic tapes have markedly been improved by taking the following procedures in combination according to the present invention;

Making a base film of polyethylene naphthalate.

Incorporating Fe—Al magnetic powder into a magnetic layer.

Arranging a BC layer containing nonmagnetic particles.

Skew property

Next, using the video tapes of Example 11 and Comparison 19, the skew properties of both video tapes were measured.

The skew property was determined by mesauring a deviation of a signal at a head in reproducing the tape which was treated by heating at 70° C. and normal humidity for one hour after being recorded at normal temperature and humidity.

The result is that the deviation of the video tape in Example 11 was 16 μsec. while that of the video tape in Comparison 19 was 29 μsec. This means the video tape of the invention showed significant improvement in the skew property.

Experiment 5

The video tapes having the composition and the ingredients of Example 11 and Comparison 17 in Experiment 4 were tested as variously changing the compositions of magnetic metal powder. The data of the video tape comprising the composition and ingredients of Example 11 refer to A (Example), while the data of the video tape comprising the composition and ingredients of Comparison 17 refer to B (Comparison).

Figure 3:
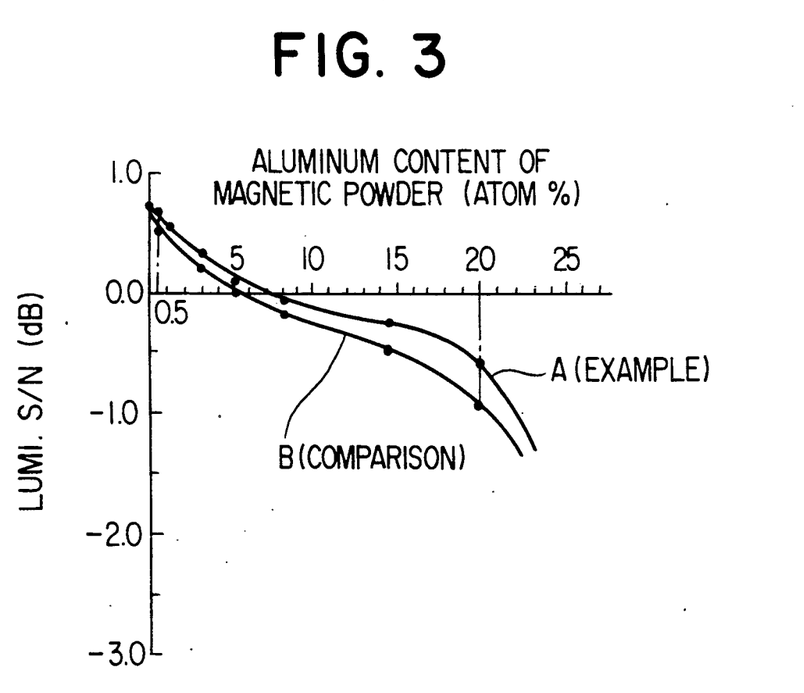
FIGS. 3 and 4 exhibit the variations of the properties vs. the variations of the Al contents.
Figure 4:
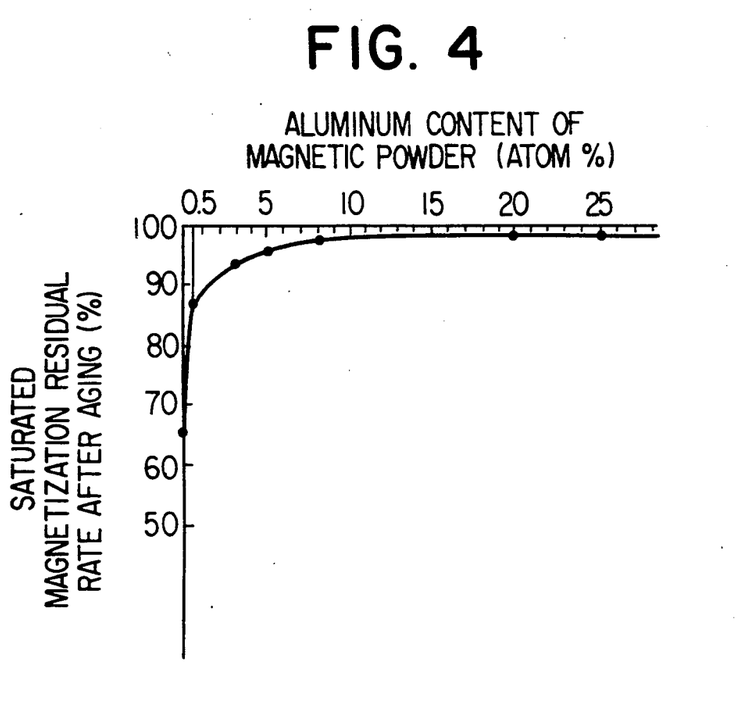

More specifically, as varying the Al content in the Fe—Al magnetic powder, a luminance S/N ratio as well as a saturated magnetization residual rate were examined and the results were illustrated in FIGS. 3 and 4. In FIG. 4 the result was illustrated only for the data of the video tape having the composition and ingredients of Example 11.

As can be seen from FIG. 4, the Al content less than 0.5 atom % in the magnetic layer resulted in rapid deterioration of saturated magnetization residual after aging. This fact exhibits that the inclusion of Al more than 0.5 atom % in the magnetic powder contributes to improving an aging resistance of the magnetic layer to a large extent. Meanwhile, FIG. 3 indicates the tendency of accelerated degradation of Lumi S/N (dB) at the Al content more than 20 atom %, which is considered to be caused by poor dispersion of the ingredients in the magnetic powder because of higher Al content, and such tendency is more notable in Comparison (B) than in Example (A). Therefore, it can be concluded from the foregoing results that aluminum contained in the magnetic powder at the range of 0.5 to 20 atom % has resulted in improving an aging resistance and a dispersibility in the magnetic layer to a large extent. It is also obvious that luminance S/N ratio has been improved by incorporating inorganic non-magnetic particles into a BC layer.

What is claimed is:

1. A magnetic recording medium comprising:
   a support comprising one material selected from the group consisting of polyethylene naphthalate and polyethylene terephthalate;
   provided on said support, a magnetic recording layer comprising a ferromagnetic metal powder, a carbon black, a lubricant, an abrasive and a binder;
   provided on an opposite side of said magnetic layer, a back coating layer comprising a carbon black, non-magnetic particles and a binder;
   wherein the Young's modulus of said magnetic recording medium in a traveling direction is not less than 1100 kg/mm².

2. The medium of claim 1, wherein the Young's modulus of said magnetic recording medium in a traveling direction is 1300 to 1800 kg/mm$^2$.

3. The medium of claim 1, wherein the Young's modulus of said magnetic recording medium in a lateral direction is 500 to 1600 kg/mm$^2$.

4. The medium of claim 1, wherein said support is made of polyethylene naphthalate.

5. The method of claim 1, wherein the thickness of said magnetic layer is less than 2.5 μm.

6. The medium of claim 1, wherein the content of said carbon black in the magnetic layer is 0.1 to 10 weight parts per 100 weight parts of the ferromagnetic metal powder.

7. The medium of claim 6, wherein the average particle size of the carbon black is 20 to 70 mμ.

8. The medium of claim 1, wherein the content of said carbon black in the back coating layer is 20 to 100 weight parts per 100 weight parts of the binder.

9. The medium of claim 8, wherein the average particle size of the carbon black is 10 to 70 mμ.

10. The medium of claim 1, wherein the composition of said ferromagnetic metal powder is selected from the group consisting of Fe—Al, Fe—Al—Ni, Fe—Al—Zn and Fe—Al—Co.

11. The medium of claim 10, wherein the content of aluminum in the ferromagnetic metal powder is 0.5 to 20 atom %.

12. The medium of claim 11, wherein said content is 1.0 to 8.0 atom %.

13. The medium of claim 1, wherein the BET specific surface area of said ferromagnetic metal powder is 40 to 90 m$^2$/gram.

14. The medium of claim 13, wherein said specific surface area is 51 to 80 m$^2$/gram.

* * * * *